United States Patent [19]
Wright et al.

[11] 3,882,364
[45] May 6, 1975

[54] INDUCTION MOTOR CONTROL SYSTEM

[75] Inventors: Floyd H. Wright; David M. Erdman, both of Fort Wayne, Ind.

[73] Assignee: General Electric Company, Fort Wayne, Ind.

[22] Filed: Apr. 8, 1974

[21] Appl. No.: 458,996

Related U.S. Application Data

[63] Continuation-in-part of Ser. No. 281,757, Aug. 18, 1972, abandoned.

[52] U.S. Cl. ........... 318/221 R; 318/221 E; 318/227
[51] Int. Cl. ............................................. H02p 1/44
[58] Field of Search ........... 318/221 R, 221 E, 227, 318/224, 230

[56] References Cited
UNITED STATES PATENTS

| | | | |
|---|---|---|---|
| 3,307,093 | 2/1967 | Wright | 318/221 R |
| 3,421,064 | 1/1969 | Phillips | 318/227 X |
| 3,489,969 | 1/1970 | Knauer et al. | 318/221 E |
| 3,508,131 | 4/1970 | Lewus | 318/227 |
| 3,530,348 | 9/1970 | Conner | 318/221 E |

*Primary Examiner*—G. Z. Rubinson

[57] ABSTRACT

A TRIAC, connected in series with the start winding of an induction motor, is fired in response to an average signal proportional to the speed of the rotor. The average signal is developed from a filtered control signal produced by a pick-up coil wound around one of the poles of the motor so as to sense flux variations, or slot ripple, resulting from the moving rotor teeth.

18 Claims, 8 Drawing Figures

INDUCTION MOTOR CONTROL SYSTEM

CROSS REFERENCE TO RELATED APPLICATION

This application is a continuation-in-part of our now pending and allowed application Ser. No. 281,757 which was filed Aug. 18, 1972, now abandoned.

BACKGROUND OF THE INVENTION

The present invention pertains to an induction motor control system. More particularly, it relates to speed-responsive control of a bi-directional switch for controlling the energization of a winding phase in the motor.

A split-phase induction motor typically has two winding phases that in some applications are called a run winding phase and a start winding phase. The start winding is so wound upon the stator as to produce flux which electrically is out of phase with that of the run winding. The interaction with the rotor of the two mutually-phase-displaced flux components creates additional torque which enables the rotor to accelerate to rated speed in a compartively short period of time.

A wide variety of systems have been devised for controlling different operating characteristics of electric motors. One frequently controlled parameter is that of speed of the rotor. In order to regulate rotor speed, it is known, for example, to develop a control signal in response to high-frequency current generated by interaction, within a magnetic field, between a winding on the stator and the sides of winding slots formed in the rotor of a direct-current motor. In the case of alternating-current induction motors, a somewhat similar speed control signal has been developed by a pair of stator coils spaced on an axis which forms an angle with respect to slots in the rotor. At least usually, such a speed control signal is utilized to govern application of power to the field of a direct-current motor or the run winding of an induction motor.

A substantial number of systems also have been suggested for controllably energizing the start winding of an induction motor. It has long been one practice to control energization of the start winding by means of a mechanical switch mounted upon the rotor and operated in response to centrifugal forces. The switch usually is designed to drop out or open when at least near rated speed is attained, while again picking up or closing whenever the speed drops below a preselected value. With the somewhat recent development of solid-state gate-operated bi-directional switches capable of handling motor power, it has been recognized that such devices might advantageously be used in place of mechanical start switches in order to avoid such problems with the latter as dirty contacts, variations in switching point and breakage due to mechanical fatigue. Typically, control of the firing of the solid-state start switch has been in response to a voltage generated by a separate tachometer generator or a current proportional to the level of alternating-current supplied to the motor. The tachometer generator is in itself an expensive component, while the relationship between motor speed and current is affected by other variables such as load upon the motor.

It is, accordingly, a general object of the present invention to provide a new and improved control system for starting an induction motor.

Another object of the present invention is to provide an induction motor start system which is capable of economic and compact construction.

A further object of the present invention is to provide a new and improved induction motor start system which is capable of being fabricated at least substantially in integratedcircuit form.

Still another object of the present invention is to combine advantageously a portion of certain approaches, heretofore recognized as having value only in connection with running control, into a new and improved induction motor start system.

SUMMARY OF THE INVENTION

The invention thus relates to a control system for an induction motor of a kind having at least a pair of poles and a multi-toothed rotor together with a first phase winding and a second phase winding. The first phase winding is energized from an alternating-current source. A bi-directional switch is used to connect the source to the second phase winding in response to a firing signal.

The first and second windings establish phase displaced flux components as will be understood. Included are means for sensing an operating characteristics of the motor to develop a control signal in response to flux variations effected by the rotor teeth. The control signal is filtered in order to remove components at the frequency of the alternating current. Responsive to the filtered control signal is a regulator that develops an average signal proportional to the rotor speed. Finally, a trigger circuit responds to the average signal by applying the firing signal to the switch, terminating the application of the firing signal when the motor speed reaches a predetermined value.

BRIEF DESCRIPTION OF THE DRAWINGS

The subject matter which is regarded as the invention is particularly pointed out and distinctly claimed in the concluding portion of this application. The invention itself, however, both as to its organization and method of operation, together with further objects and advantages thereof, may best be understood by reference to the following description taken in connection with the accompanying drawing, in the several figures of which like numerals designate like elements, and in which:

FIG. 2b is a schematic diagram of a modification of the system of FIG. 2a;

FIG. 6 is a schematic diagram of another modification of the system of FIG. 2a.

DETAILED DESCRIPTION OF THE EMBODIMENTS

Figure 1:
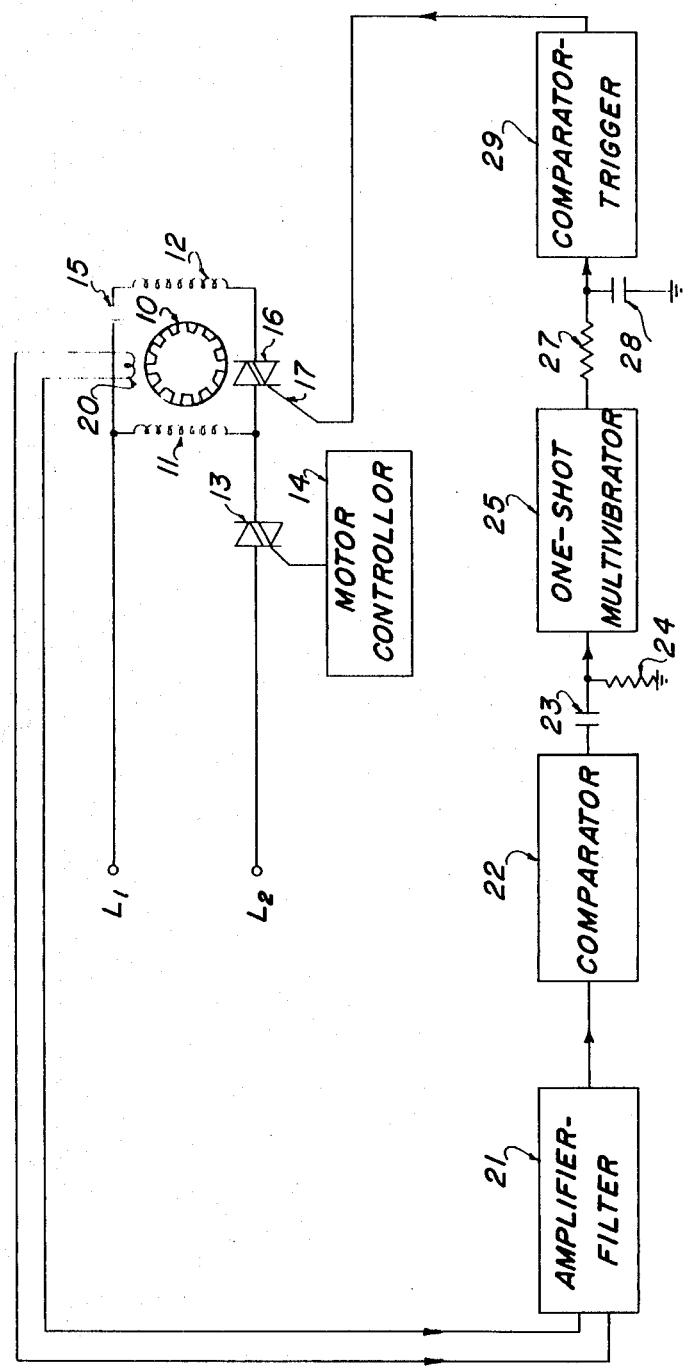
FIG. 1 is a partly schematic and partly blockform diagram of one embodiment of the present invention.

In FIG. 1, an induction motor has a rotor 10, a first winding in the form of a run winding 11 and a second winding in the form of winding 12. One end of winding 11 is connected directly to a terminal $L_1$ of an alternating-current power source, typically exhibiting a frequency of 60 hertz. The other end of winding 11 is connected through a TRIAC 13 to the opposite terminal $L_2$ the alternating current source. TRIAC 13 is a solid-state gate-operated bi-directional switch which becomes conductive in response to the application of a firing signal applied to its gate from a motor controller 14. Controller 14, for present purposes, may either have simply an on-off function or respond to some condition of motor operation, such as applied line voltage, in order to vary the on-time of switch 13 during each cycle and thereby compensatingly control motor operation.

One side of start winding 12 also is coupled to alternating-current source terminal $L_1$ through a starting capacitor 15, while the other side of start winding 12 is connected through another TRIAC 16, and then through TRIAC 13, to the other line terminal $L_2$. TRIAC 16 includes a gate 17. Upon the application of firing signals to gate 17, TRIAC 16 becomes conductive and enables the flow of energizing current to start winding 12. Throughout the following, it is preferred that a TRIAC or equivalent device be used for energizing the start winding. It is to be recognized, however, that even a simple relay could be substituted in any case where its obvious disadvantages were acceptable.

In itself, the induction motor is entirely conventional. It thus includes at least a pair of poles upon which windings 11 and 12 are wound, and rotor 10 is of the multi-toothed or squirrel-cage type. Also wound around one of the poles of the motor is a pick-up winding or coil 20 which, during motor operation, develops a control signal in response to flux variations effected by the rotor teeth. The pick-up coil 20 could be wound around a single one of the stator teeth if desired, or alternately the coil could be a winding distributed about a plurality of teeth. With a single coil approach, however, an additional stage of filtering may be required to remove line frequency components. Considering that the rotor teeth are separated by slots, the control signal produced by pick-up coil 20 is appropriately termed the slot ripple voltage. The ripple frequency is directly related both to the speed of rotor 10 and the number of rotor slots. Since the latter are fixed in number in any given motor, the ripple frequency thus is proportional to motor speed.

In each of the embodiments hereinafter to be described, it is specifically contemplated that pick-up coil 20 be utilized to sense the slot ripple voltage. However, it is to be noted that the slot ripple flux variations also may be sensed in the the run winding and within the stator. Also, they necessarily modulate the line current in a small amount. That is any of several different operating characteristics may be sensed in order to produce the desired slot ripple signal. Accordingly, feasible alternatives for the purpose of sensing and developing a slot ripple signal include use of a tap from the run winding, a line current sensor, or a Hall-effect or equivalent device inserted into the stator. In any such case, care must be taken to filter the developed signal in order to remove the 60 Hz main power supply component and all harmonic components having frequencies below those in the desired range of the slot ripple frequencies. If too much 60 Hz component is present, an additional stage of filtering may be required.

The control signal developed by coil 20 is fed through an amplifier-filter 21 to a comparator 22. Besides amplifying, stage 21 serves to remove or block passage of signal components inherently picked up by coil 20 at the 60 hertz power-line frequency. Comparator 22 responds to the filtered control signal by both amplifying and limiting the latter in order to develop a voltage of square waveform which at least predominantly exhibits the slot ripple frequency. The square wave from the output of comparator 22 is then differentiated upon passage through a capacitor 23 shunted to ground on its output side by a resistor 24. Of course, differentiating the square waves results in corresponding pulses, the frequency of which again is related to motor speed and the number of rotor slots.

A one-shot multivibrator 25 responds to the differentiation pulses by producing at its output a respective series of rectangular pulses of sharp, well-defined characteristics so as to have constant pulse width and height. The only variation is that of frequency in correspondence with the frequency of the differentiation pulses fed to the input of multivibrator 25.

An integrator, composed of a series resistor 27 and a shunt capacitor 28, next averages the rectangular pulses from the output of multivibrator 25 in order to develop an average signal in the form of a direct-current voltage. The latter voltage has a magnitude which is a function of the average slot ripple frequency and which is proportional to motor speed.

A comparator-trigger stage 29 responds to the integrated average signal appearing across capacitor 28 in order to control the operation of solid-state switch or TRIAC 16. More specifically, the trigger function of stage 29 serves to apply a firing signal to gate 17, thus this enable energization of start winding 12, until the speed-representative average signal exceeds a threshold level in the comparator portion of stage 29. At that point, the application of the firing signal to TRIAC 16 is terminated and start winding 12 is de-energized. Preferably, the firing signal is again applied to gate 17 of TRIAC 16 when the average signal significantly decreases in level, representing a substantial lowering of the speed of rotor 10. That is, comparator-trigger stage 29 exhibits hysteresis. As will be illustrated further, the firing signal itself may either be a continuous potential of a level to maintain gate 17 above its threshold value or a series of firing pulses timed to start conduction in TRIAC 16 anew after each zero crossing of the applied power waveform. After each such zero crossing, the TRIAC renders itself nonconductive in which state it remains until application of the next firing pulse. In any event, it will be observed that comparator 22, the differentiator, multivibrator 25 and the integrator constitutes a regulator which responds to the filtered control signal in order to develop the speed-proportional average signal which is applied to comparator-trigger stage 29.

Figure 2A:
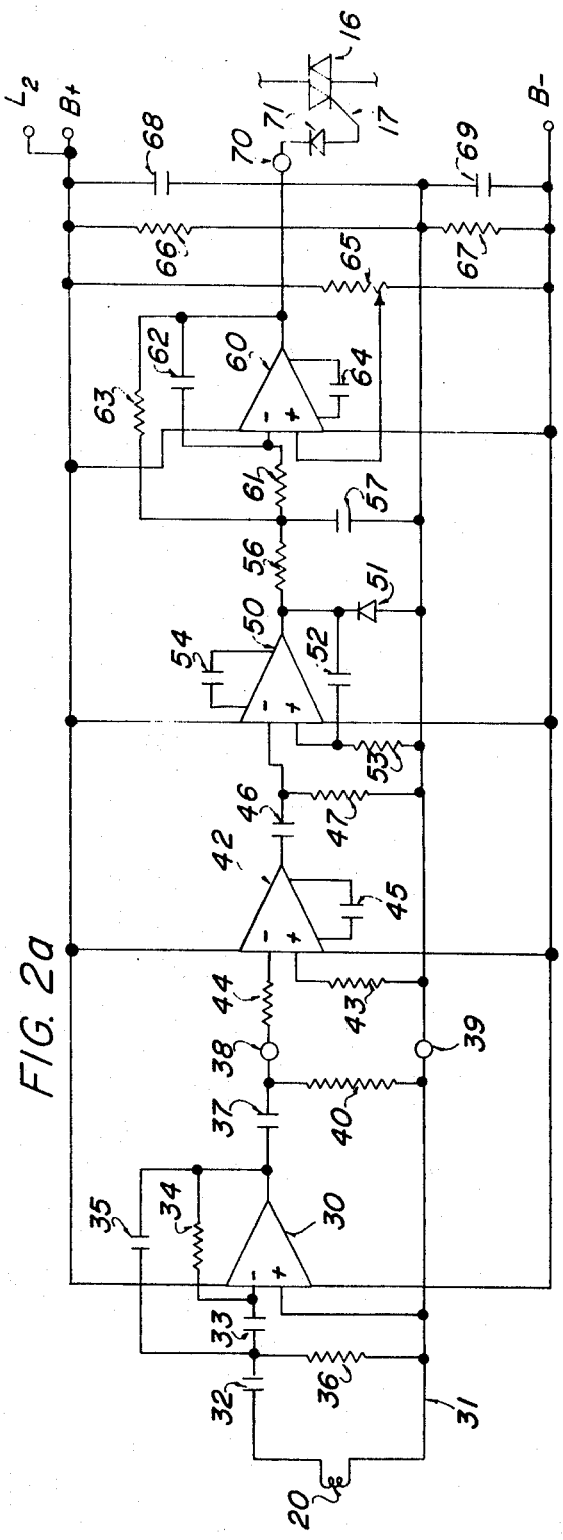
FIG. 2a is a schematic diagram of one version of the system of FIG. 1.

An analog version of the system of FIG. 1 is depicted in FIG. 2a. A total of four operational amplifiers, each connected so as to operate in its inverting mode, are intercoupled and associated with discrete components so as to perform the functions outlined in connection with the system of FIG. 1. Thus, a first operational amplifier 30 is arranged as a multiple-feedback high-pass filter so as to amplify and pass the slot ripple voltage components while preventing passage of the power line component and low-order harmonics in the control signal from pick-up winding or coil 20. Accordingly, one side of coil 20 is connected to a common 31, while its other side is coupled through a capacitor 32 and another capacitor 33 to the minus input of amplifier 30. A feedback resistor 34 is connected between the output terminal of amplifier 30 and its negative input terminal, while a feedback capacitor 35 is connected between that output terminal and the junction between capacitors 32 and 33. A resistor 36 is shunted between the latter junction and common to which the plus input terminal of amplifier 30 also is returned. The amplified and filtered control signal from the output of amplifier 30 is fed through a coupling capacitor 37 to a filter output terminal 38, common lead 31 being connected to the other filter output terminal 39 and the two output terminals being shunted by a resistor 40. A second operational amplifier 42 has its plus and minus input terminals connected to filter output terminals 39 and 38 respectively through resistors 43 and 44. Also connected to appropriate terminals of amplifier 42 in a conventional manner is a frequency compensation capacitor 45. The relative values of resistors 43 and 44 are selected so that amplifier 42 functions in a manner, known per se, as a comparator and also saturates so as to limit the applied control signal. Consequently, the signal appearing at the output of operational amplifier 42 is a square wave which again is predominantly of the slot ripple frequency. The square wave is fed through a differentiator, composed of a series capacitor 46 and a shunt resistor 47, so as to develop a corresponding series of sharp pulses which are applied to the negative input terminal of still another operational amplifier 50.

Amplifier 50 is arranged to act as a one-shot multivibrator by the provision of a diode 51 shunted from its output terminal to common and a capacitor 52 connected between that output terminal and the plus input terminal of the amplifier. The latter terminal also is returned to common through a resistor 53. A frequency compensation capacitor 54 again is connected between the usual terminals of amplifier 50. In operation, well defined pulses of constant character appear at the output of amplifier 50 so as to constitute a modified form of the control signal in which the variable which is proportional to the speed is the repetition rate of the pulses.

An integrator, composed of a series resistor 56 and a shunt capacitor 57, responds to the square pulses appearing at the output of operational amplifier 50 by integrating the latter to develop a direct-current average signal. That is, it is the direct-current potential instantaneously appearing across capacitor 57 which at this point in the system is proportional to the speed of the motor. That direct-current signal is applied to the input of a final operational amplifier 60 which in this case is arranged as a multiple-feedback low-pass filter so as to respond only to the direct-current information. Thus, the junction between resistor 56 and capacitor 57 is connected through a resistor 61 to the minus input terminal of amplifier 60. A feedback capacitor 62 is connected between the output terminal of amplifier 60 and its minus input terminal, while a feedback resistor 63 is connected between that output terminal and the aforementioned junction between resistor 56 and capacitor 57. As before, a frequency compensation capacitor 64 is connected between the frequency compensation terminals of amplifier 60. The other or plus input terminal of operational amplifier 60 is returned to the movable tap of a potentiometer 65 connected between the positive and negative terminals B+ and B− of a direct current supply. In this case, the B+ terminal is also connected to power line terminal $L_2$ (FIG. 2a). In addition, the appropriate positive D.C. supply terminals of operational amplifiers 30, 42, 50 and 60 are connected to the B+ terminal, while the negative D.C. supply terminals of those operational amplifiers are returned to the B− supply terminal. Appropriate D.C. reference levels for the different amplifiers are established by the connection of common 31 to the midpoint of a voltage divider extending between the D.C. supply terminals and composed of resistors 66 and 67 respectively shunted by by-pass capacitors 68 and 69.

Adjustment of the position of the tap on potentiometer 65 determines the threshold level at which operational amplifier 60 develops a useful output or firing signal which is fed by way of a terminal 70 and a blocking diode 71 to gate 17 of TRIAC 16. Consequently, in the system of FIG. 2a TRIAC 16 fires on each applied half-cycle of the alternating waveform whenever the firing signal is being produced at the output terminal of operational amplifier 60. In use, potentiometer 65 is adjusted so that operational amplifier 60 continues to develop an output signal, and thus enable firing of TRIAC 16, until the average signal appearing across capacitor 57 reaches a level sufficient to terminate application of the firing pulse to gate 17 from operational amplifier 60.

While the system of FIG. 2a may be constructed entirely of discrete components, it preferably is composed in large part of monolithic integrated circuits. To this end, the operational amplifiers advantageously are included by use of a pair of MC1302P dual monolithic integrated circuits. Each of the dual units includes a pair of individual operational amplifiers. The various discrete components thus interconnect the different terminals of each monolithic package as well as interconnecting between the various terminals of the two different units. Since these particular integrated circuits are a standard, commericially available item, the resulting entire control system may be formed at reasonable cost and the resulting overall package is sufficiently compact that it may be mounted entirely within a small housing mounted to the motor shell.

Figure 2B:
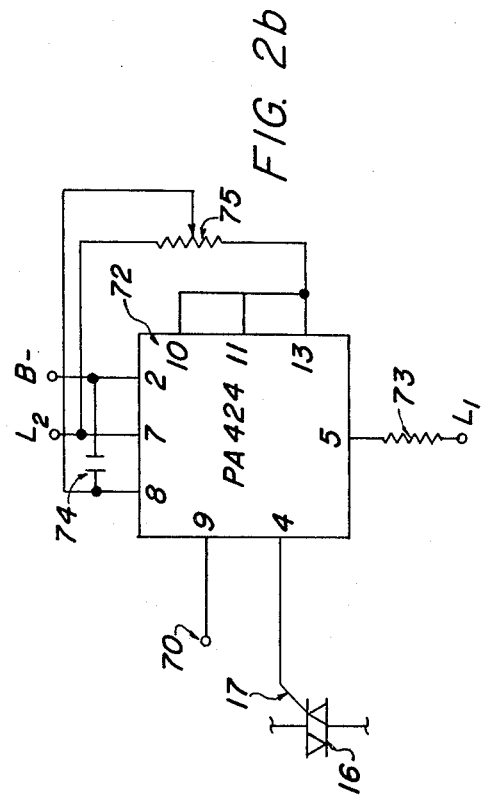

FIG. 2b illustrates a modification of the system of FIG. 2a which introduces hysteresis into the control characteristic and applies firing pulses to gate 17 of TRIAC 16 in timed relationship with the zero crossings of the alternating current waveform which appears across the TRIAC. To this end, a zero-voltage switch 72 is interposed between terminal 70, connected to the output terminal of operational amplifier 60, and gate 17. As illustrated, switch 72 is a standard PA424 integrated circuit which acts as a combination threshold detector and trigger generator. Since its detailed internal circuitry and manner of operation are now well known to the art, it is sufficient for present purposes to note that it includes a differential-amplifier input section, a zero-crossing detector and an output amplifier. In response to an input signal exceeding a predetermined threshold value, it produces an output firing pulse timed in correspondence with the point of zero voltage in the applied power-supply waveform. As shown in the drawing, the numerals within the rectangle constitute the standardized denominations for the different terminals of the device.

As specifically implemented herein, the input signal from terminal 70 (FIG. 2a) is applied to terminal 9, while the output firing pulses from terminal 4 are fed to gate 17 of the TRIAC. Terminal 5 is connected through a resistor 73 to alternating-current power terminal $L_1$ as part of the power supply to switch 72 as well as to provide the necessary zero-crossing information for the zero-crossing detector. The other power supply terminal $L_2$ is connected to terminal 7, and terminal 2 is connected to the B— D.C. supply terminal as a point of reference. Terminal 8 is returned to terminal 2 through a feedback capacitor 74 in order to introduce the desired hysteresis effect. To provide a controlled hysteresis function in a manner known as such, a variable resistor 75 bridges terminals 7 and 13 and terminal 8 is connected to a tap on that resistor. Finally, terminals 10, 11 and 13 are connected together.

In the manner already discussed above in connection with comparator-trigger stage 29 of the system of FIG. 1, zero-voltage switch 72 responds to the speed-representative signal from the output of operational amplifier 60 by applying firing pulses to gate 17 until an upper threshold level is reached at which point the application of firing pulses is terminated. Upon a subsequent decrease of motor speed below a lower threshold level, zero-voltage switch 72 "picks up" and again applies firing pulses to gate 17 so as to permit re-energization of the motor start winding. Firing pulses from the zero-voltage switch are terminated when operational amplifier 60 saturates, thus effectively removing the input to terminal 9 of switch 72.

Figure 3:
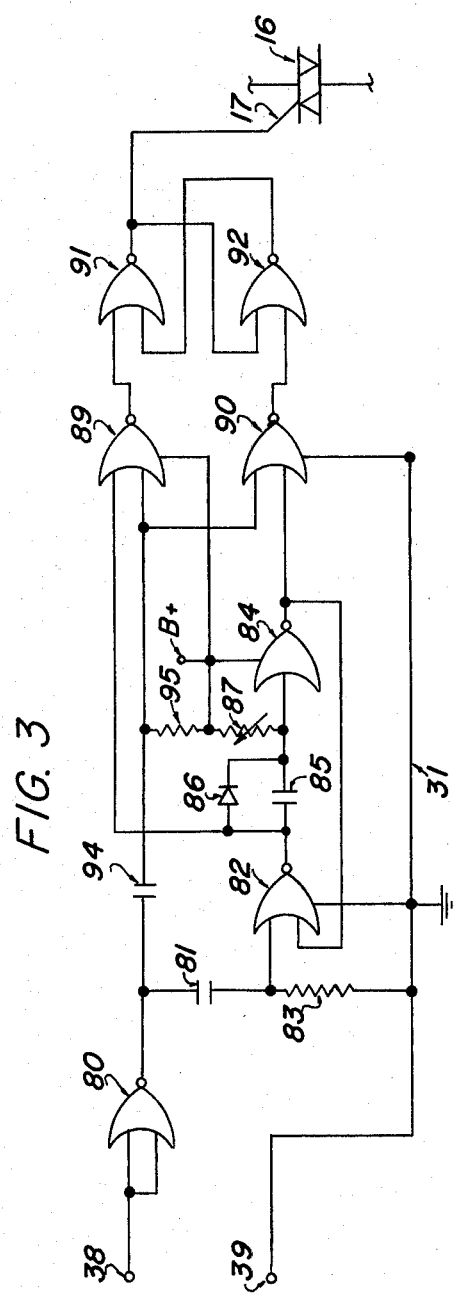
FIG. 3 is a schematic diagram of another modification of the system of FIG. 22.

A digital version of the system of FIG. 1 involves the use of a plurality of logic gates as shown in FIG. 3. The amplifier and filter of the stage including operational amplifier 30 of FIG. 2a also form a part of the overall system of FIG. 3 or 4. Consequently, only that portion of the system beyond terminals 38 and 39 of FIG. 2a are illustrated in either FIG. 4 or FIG. 3. Thus, in FIG. 3, terminal 39 is connected to a continuation of common 31 which in this case also is connected to ground. Terminal 38 is connected to both input terminals of a NOR gate 80 which serves in operation to square the filtered control signal. The output terminal of gate 80 is connected through a differentiating capacitor 81 to an output terminal of a NOR gate 82, the differentiating network being completed by a resistor 83 shunted between the latter input terminal and common.

Gate 82 is associated with another NOR gate 84 in an arrangement which will be recognized, as such, to constitute a one-shot multivibrator. Thus, the output terminal of gate 82 is connected through a charging capacitor 85 to the input terminal of gate 84, and the output terminal of the latter is connected back to the other input terminal of gate 82. A compensating diode 86 shunts capacitor 85 and a variable resistor 87 connects the side of capacitor 85, connected to the input of gate 84, to the B+ terminal.

A plurality of four additional NOR gates 89, 90, 91 and 92 are interconnected in what will be observed to constitute a clocked flip-flop network. One timing pulse to the network is obtained by way of a connection between the output terminal of gate 84 and an input terminal of gate 90. Another, reverselevel, timing pulse for the network is obtained by means of a connection between the output terminal of gate 82 and an input terminal of gate 89. The control pulses are fed in common to the other input terminals of gates 89 and 90 after differentiation by means of a capacitor 94 and a resistor 95; specifically, capacitor 94 is connected between the output terminal of NOR gate 80 and the common input terminals of gates 89 and 90, while shunt resistor 95 is returned to the B+ terminal. Consequently, these differentiated control pulses are negative going with respect to the power supply reference. On the other hand, the differentiated pulses applied to trigger the input of the multivibrator at gate 82 are positive going with respect to the same reference.

The output terminal of gate 89 is connected to an input terminal of gate 91, and the output terminal of gate 90 is similarly connected to an input terminal of gate 92. The other input terminal of gate 91 is connected to the output terminal of gate 92, and the other input terminal of gate 92 is connected to the output terminal of 91. The output terminal of gate 91 is also connected to gate 17 of TRIAC 16 for the purpose of supplying the firing pulses to the latter.

In a practical implementation again advantageously employing readily available and standard monolithic integrated circuits, all of the NOR gates in FIG. 3 are combined in a pair of MC 824 quad two-input gates. This monolithic package consists of four two-input positive logic NOR gates. Using one package for gates 89–92, it is necessary to make only one set of direct current-connections to supply power to all four of those gates. Hence, a B+ connection is shown leading to gate 89, and a ground connection is shown as leading to gate 90. Similarly, gates 80, 82 and 84 are all contained in the other quad package. The B+ terminal is shown in FIG. 3 as being connected to gate 84, and ground is connected to gate 82.

Overall system operation once again is basically the same as already described in connection with the preceding figures. In this case, however, the specific arrangement of FIG. 3 serves as a frequency comparator which responds to the relative timing between the period of the filtered control signal and the period of a timing signal developed by the one-shot multivibrator. More particularly, when the differentiated control pulse from capacitor 94 is applied to gate 89 while the one-shot multivibrator is timing, the flip-flop composed of gates 91 and 92 is conditioned so that no firing signal is applied to gate 17 of TRIAC 16. This occurs whenever the control signal frequency is above a threshold frequency determined by the period of the multivibrator. When, however, the differentiated control pulse, which also is applied to gate 90, appears after the multivibrator has completed timing, gate 92 is triggered from gate 90 as a result of which the flip-flop produces a firing signal which is fed to the TRIAC gate. This happens whenever the control signal frequency is below a threshold frequency again determined by the period of multivibrator. It will thus be seen that the "integrating" or "averaging" function of the overall system is achieved by taking advantage of the time constant of the one-shot multivibrator itself. The period of that multivibrator is selected to set the desired threshold level by adjustment of variable resistor 87.

Figure 4:
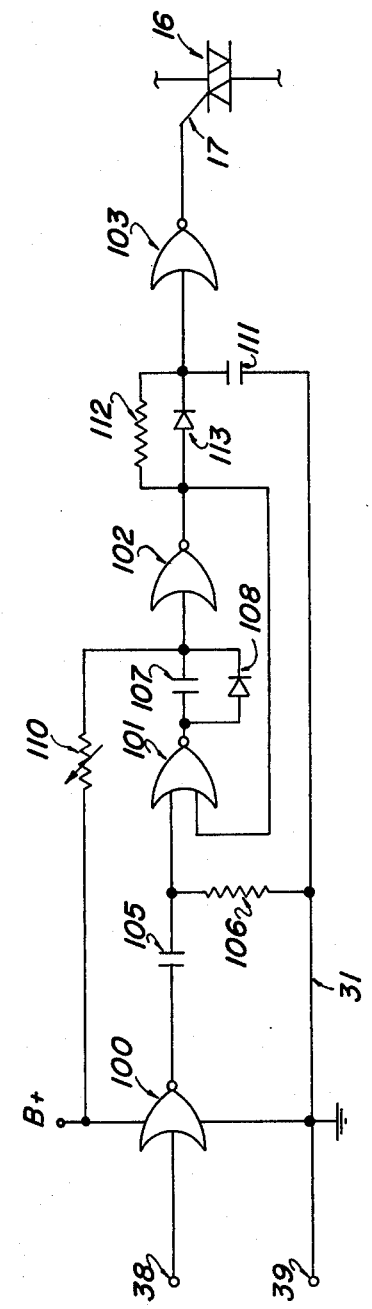
FIG. 4 is a schematic diagram of yet another modification of that system.

A simplified version, although exhibiting less precision of detection capability, is shown in FIG. 4. In this case, a single MC824P monolithic integrated circuit preferably is employed to provide a total of four NOR gates 100, 101, 102 and 103. Being combined into a single package, the necessary direct current for all four gates is indicated in the drawing by the mere connection of a pair of appropriate terminals on gate 100 respectively to the B+ and ground terminals. An extension of common lead 31 is again made from filter-output terminal 39, while the other filter output terminal is connected to the input of gate 100. The output terminal of the latter gate is connected through a differentiating capacitor 105 to an input terminal of gate 101. A differentiating resistor 106 is shunted between the latter input terminal and common.

Gate 101 is combined with gate 102 to form a one-shot multivibrator. Consequently, the output terminal of gate 101 is connected through a charging capacitor 107 to the input terminal of gate 102, and the output terminal of the latter is connected back to the other input terminal of gate 101. A compensating diode 108 is connected in shunt with capacitor 107, and a variable resistor 110 is connected between the B+ terminal and the junction between capacitor 107 and the input terminal of gate 102. As in the case of FIG. 3, variable resistor 110 serves to permit adjustment of the desired threshold level in correspondence with the desired cut out of the start winding. However, a separate integrating capacitor 111 is employed in the system of FIG. 4. The output of gate 102 is connected to the input of gate 103 through the parallel combination of a series resistor 112 and a diode 113. The size of resistor 112 is about the same as that of the output resistance of gate 102 so that, in combination with diode 113, capacitor 111 is permitted both to charge and to discharge through the same value of resistance. The output terminal of gate 103 is connected to gate 17 of TRIAC 16.

In operation, gate 100 serves to square the filtered control signal. Its output pulses are first differentiated to produce spikes which successively initiate operation of the multivibrator. The well-defined signals from the latter then are integrated and applied to gate 103 which once again serves as a comparator and trigger.

Figure 5:
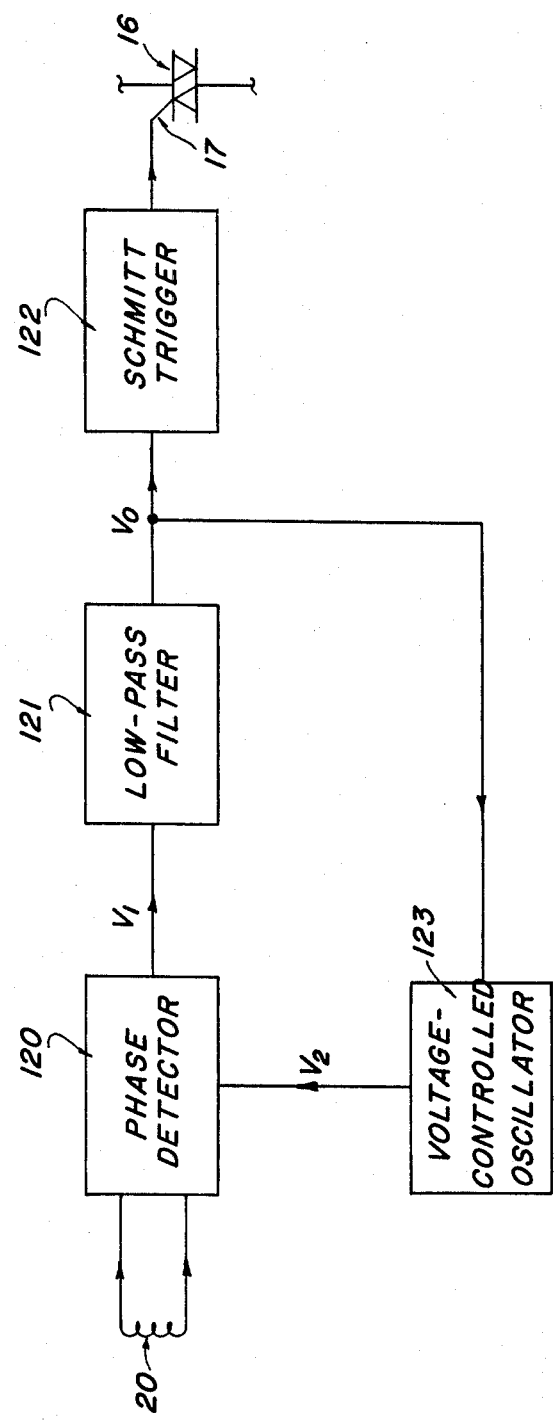
FIG. 5 is a schematic diagram of an alternative embodiment of the present invention.

Turning to the embodiment of FIG. 5, a system is depicted which is particularly advantageous in that it reduces the number of capacitive elements involved. That, in turn, substantially minimizes the number of discrete components required when utilizing monolithic integrated circuits to form the different stages. In more detail, a phase detector 120 responds to the control signal developed by pick-up coil 20 develop an output voltage $V_1$. The latter signal is fed through a low-pass filter 121 from the output of which is derived an average signal $V_o$ that is proportional to the speed of the motor. This average signal is fed to a Schmitt trigger circuit 122 which develops the firing pulses that are applied to gate 17 of TRIAC 16. Completing a phase-locked loop, the average signal $V_o$ from the output of low-pass filter 121 is fed back to control the frequency of a voltage-controlled oscillator 123. The output signal $V_2$ from oscillator 123 is fed into phase detector 120 for comparison by the latter with the incoming control signal from coil 20.

Schmitt trigger circuit 122 generates firing pulses for application to gate 17 until a desired motor speed is attained at which point the firing pulses are terminated. On a subsequent reduction of motor speed by a selected amount, and a corresponding change in the level of $V_o$, the trigger circuit again produces firing pulses that are applied to the TRIAC gate so as to re-energize the start winding of the motor. The resulting phase-locked loop latches onto the slot ripple signal from winding 20 and tracks that signal as it changes frequency. The detailed manner of operation may be better appreciated by analyzing the conditions that obtain within this phase-locked loop.

Representing the control signal supplied from winding 20 by the expression $$B \cos\omega_i t + \text{harmonics of 60 hz},\qquad(1)$$

where $B$ is a constant, $t$, is time and $\omega_i$ is the slot ripple frequency, the oscillator output voltage $V_2$ may be represented by the expression $$A \cos\omega t,\qquad(2)$$

where $A$ is a constant and $\omega$ is the oscillator frequency. As a result, the detected signal from the output of phase detector 120 is expressed by the equation:

$$V_1 = \frac{AB}{2}\cos(\omega+\omega_i)t + \frac{AB}{2}\cos\theta + D\cos(\omega\pm 60)t + E\cos(\omega\pm 180)t\ldots,\qquad(3)$$

where all capital letters are constants and $\theta$ is the phase angle between the slot ripple signal and the oscillator output voltage. Thus, angle $\theta$ is proportional to the slot ripple frequency. As will be apparent by inspection of equation (3), the second term represents a direct-current voltage. It is this quantity which is passed by filter 121. Consequently, the average signal $V_o$ used to control the operation of Schmitt trigger circuit 122 may be expressed:

$$V_o = \frac{AB}{2}\cos\theta \qquad(4)$$

In order to maintain lock of the phase loop, the oscillator frequency $\omega$ is equated to the value $K_iV_o$, $K_i$ representing the proportionality constant of the oscillator voltage control. In practice, any suitable phase detector may be employed. An analog multiplier constitutes a useful type because such circuitry is readily available commercially. Voltage-controlled oscillator 123 similarly may be of any appropriate type, provided that, in any event, it is constrained from oscillating below the order of 600 Hz so that the phase-locked loop does not latch onto the 60 Hz component or any significant harmonics thereof. Advantageously, the functions of detector 120, filter 121 and oscillator 123 may all be obtained in a single integrated circuit such as Signetics type NE565.

Figure 6:
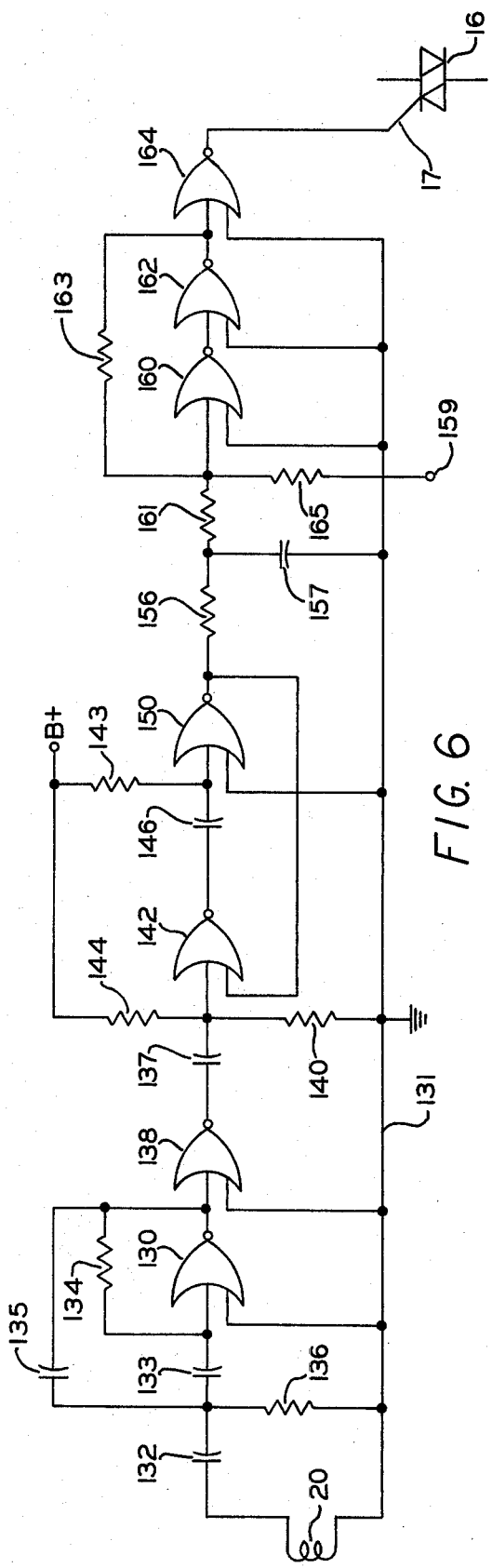

FIG. 6 depicts a version of the system of FIG. 2a wherein logic gates are used to perform the functions of the operational amplifiers of FIG. 2a. This system of FIG. 6 even uses a logic gate to replace the operational amplifier 30 of FIG. 2a to perform the function of filtering. Accordingly, a first logic gate 130 is arranged as an active high pass filter so as to pass the slot ripple frequency components while preventing passage of the power line frequency components and its low order harmonics that exist in the control signal from pick-up winding 20. One side of coil 20 is connected to common conductor 131, while its other side is coupled through a capacitor 132 and another capacitor 133 to one input of logic gate 130. A feedback resistor 134 is connected between the output terminal of logic gate 130 and the same input terminal as capacitor 133; while a feedback capacitor 135 is connected to the output terminal of logic gate 130 and the junction between capacitors 132 and 133. A resistor 136 is shunted between the latter junction and common 131. The other input of the logic gate 130 also is returned to common 131. The filtered control signal from the output of logic gate 130 is fed to one of the inputs of logic gate 138. Logic gate 138 serves as an amplifier for the filtered control signal. The second input of logic gate 138 is tried to common 131. The filtered and amplified control signal from gate 138 is fed through a differentiating and biasing network to drive a one-shot multivibrator comprised of logic gates 142, 150, resistor 143, and capacitor 146. The differentiating and biasing network is composed of capacitor 137 and resistors 140 and 144. Capacitor 137 is connected between the output of logic gate 138 and the junction of one side or end of resistor 140 and one end of resistor 144, which junction also is connected to one of the inputs of logic gate 142. The other end or side of resistor 144 is connected to the B+ terminal of a power supply, while the other side of resistor 140 is connected to common 131. The output of logic gate 142 is coupled through capacitor 146 to one of the inputs of logic gate 150, and the output of logic gate 150 is fed back to the other input of logic gate 142. The second input of logic gate 150 is tied to common 131. Resistor 143 is tied from the first input of logic gate 150 to the B+ terminal of the power supply. Resistor 143 and capacitor 146 determine the pulse width of the output pulse of the one-shot multivibrator. The output of the one-shot multivibrator (appearing at the output of gate 150) is fed to a low pass filter which is formed by resistor 156 and capacitor 157. Resistor 156 is connected to the output of logic gate 150 and to capacitor 157 which shunts the junction of resistors 156 and 161 to common 131. One side of resistor 161 forms a junction with resistor 163 and resistor 165 which junction also feeds one of the inputs of logic gate 160. The output of logic gate 160 is connected to one of the inputs of logic gate 162 while the output of logic gate 162 is connected through resistor 163 back to one of the inputs of logic gate 160. The second inputs of logic gates 160 and 162 are both connected to common 131. Resistors 161, 163 and 165 along with the two logic gates 160 and 162 form a Schmitt trigger, with resistor 163 and resistor 165 determining the cut out and cut in voltages of the Schmitt trigger. The output of the Schmitt trigger is fed to one of the inputs of logic gate 164 which is a gate driver for gate 17 of triac 16. The other input of logic gate 164 is tied to common 131. One end of resistor 165 is tied to a bias voltage at point 159, which bias voltage is a predetermined reference for the Schmitt trigger. Power for the logic gates is supplied in a typical fashion which is well known in the art. As an example, a rectifier, filter and zener circuit could be connected to a top in the main winding of the motor and the circuit output could be used to power the logic gates.

In the system of FIG. 6, the signal containing the slot ripple frequency is fed into the high pass filter. This removes the 60 cycle line frequency and the significant harmonics of the line. If additional filtering is required, another filter stage can be added in series with the first stage of filtering. Only the higher frequency slot ripple signal remains after filtering. This is amplified and used to trigger the one-shot multivibrator. The output of the one-shot multivibrator is a train of uniform pulses with a repetition rate of the same as the slot ripple signal. This train of pulses is averaged in the low pass filter to obtain a D.C. voltage proportional to the slot ripple frequency which is proportional to motor speed. The Schmitt trigger compares this voltage to a predetermined reference so as to control operation of the triac thru the gate driver stage. One of the advantages of this circuit is that it uses low cost C/MOS (complementary metal oxide semiconductor) logic integrated circuits. Because of the high input impedance of the C/MOS circuit, very small capacitors can be used which are less expensive than the capacitors that would be used in a conventional circuit. The logic gates used are NOR gates but it will be understood that other logic gates could be used in like manner. The NOR logic gates are provided by two CD4001A integrated circuits.

Figure 7:
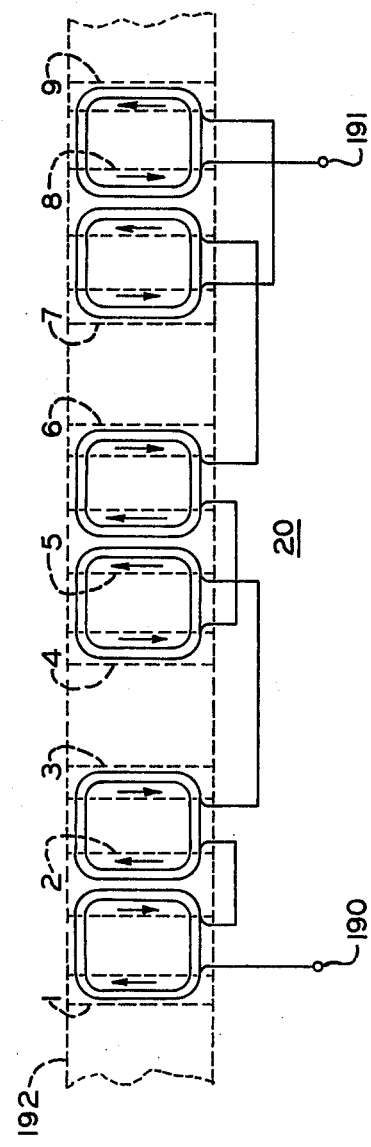
FIG. 7 is a schematic representation of a pick-up coil winding.

FIG. 7 illustrates schematically how pick-up coil 20 (see FIG. 1, 2a, 5, or 6) can be wound for a preferred embodiment in a four pole motor with 36 stator slots and 44 rotor slots and where the main winding has a sinusoidal distribution. A segment of a stator core 192 has been shown in phantom to represent the location of nine stator core slots 1–9. This segment is shown as if it were a flat rather than curved structure. The largest main winding coil occupies slots 1 and 9, which are the outer slots defining one pole. Starting at terminal 190 with the pick-up coil 20 wire, it is wound into slot 1 back down through slot 2 and into slot 1 again until five turns are made. Then up through slot 2 over to slot 3 and down and over to slot 2 until five turns are made. The wire is then taken over and up through slot 5 and back down slot 4. The winding continues up slot 5 and down slot 4 until five turns are made, then back up slot 5 and down slot 6 until five more turns are made. The winding then continues up slot 8 and down through slot 7 for five turns then up slot 9 and back down through slot 8 until five turns are completed then out to terminal 191. The arrows in FIG. 7 indicate direction of winding the coil 20 in the given slots of a pole. The slots are numbered one through nine to represent the slots of a four pole motor having 36 stator slots. Pick-up coil 20 wound in this manner produces a sufficient slot ripple signal while significantly suppressing the amount of line voltage fundamental frequency content.

Several different systems and modifications thereof have been illustrated for the purpose of controlling a TRIAC used to energize and de-energize a first or main winding in an induction motor. Standard, commercial integrated circuits packages are used to supply a major portion of the different operational actions required. This, in turn, results both in compactness and economy.

While in accordance with the patent statutes, there have been described what at present are considered to be the preferred embodiments of the invention, it will be obvious to those skilled in the art that numerous changes and modifications may be made therein without departing from the invention and it is, therefore, aimed in the appended claims to cover all such equivalent variations as fall within the true spirit and scope of the invention.

We claim:
1. A control system for an induction motor with at least a pair of poles and a multi-toothed rotor and having a first winding and a second winding, comprising:

means for energizing said first winding from an alternating-current source;
a bidirectional switch for connecting the source to the second winding in response to a firing signal;
means for sensing an operating characteristic of said motor and developing a control signal in response to flux variations effected by the teeth in said rotor, the control signal including a ripple frequency corresponding to movement of slots between said teeth past one of said poles;
filter means for removing from said control signal components having frequencies of the alternating current;
regulating means responsive to the filtered control signal for developing an average signal that is proportional to said ripple frequency and that is also proportional to the speed of said rotor, said regulating means including a comparator responsive to said filtered control signal for developing a control voltage representative of the ripple frequency;
and trigger means for applying said firing signal to said switch and responsive to said average signal for terminating the application of said firing signal when said speed reaches a predetermined value.

2. Apparatus as defined in claim 1 in which said comparator includes an operational amplifier coupled between said filter means and said trigger means and exhibiting a high-pass frequency characteristic.

3. Apparatus as defined in claim 1 in which said comparator includes a logic gate coupled between said filter means and said trigger means and exhibiting a squaring function to said control signal.

4. A control system for an induction motor with at least a pair of poles and a multi-toothed rotor and having a first winding and a second winding, comprising:
means for energizing said first winding from an alternating-current source;
a bidirectional switch for connecting the source to said second winding in response to a firing signal;
means for sensing an operating characteristic of said motor and developing a control signal in response to flux variations effected by the teeth in said rotor, the control signal including a ripple frequency corresponding to movement of slots between said teeth past one of said poles;
filter means for removing from said control signal components having frequencies of the alternating current;
regulating means responsive to the filtered control signal for developing an average signal proportional to the speed of said rotor and said average signal being proportional to the frequency of said control pulses, said regulating means including means responsive to the filtered control signal for developing a square wave representative of the ripple frequency and means for differentiating said square wave to develop control pulses;
and trigger means for applying said firing signal to said switch and responsive to said average signal for terminating the application of said firing signal when said speed reaches a predetermined value.

5. Apparatus as defined in claim 4 in which said regulating means further includes a one-shot multi-vibrator responsive to said control pulses and from the output of which said average signal is developed.

6. Apparatus as defined in claim 5 in which said multi-vibrator includes an operational amplifier that exhibits a squaring function.

7. Apparatus as defined in claim 5 in which said multi-vibrator includes a pair of interacting logic gates.

8. Apparatus as defined in claim 1 in which said regulating means includes an integrator responsive to said control signal for developing said average signal.

9. Apparatus as defined in claim 8 in which said trigger means includes a comparator responsive to said average signal for developing said firing signal.

10. Apparatus as defined in claim 9 in which said comparator includes an operational amplifier coupled between said integrator and said switch and exhibiting a low-pass frequency characteristic.

11. Apparatus as defined in claim 9 in which said comparator includes a logic gate coupled between said integrator and said switch.

12. Apparatus as defined in claim 9 in which said comparator includes a zero-voltage switch responsive to said average signal and the alternating current for developing said firing signal in timed relation to zero crossings of the alternating-current power.

13. Apparatus as defined in claim 9 in which said comparator exhibits hysteresis, becoming effectively non-conductive when said speed reaches said predetermined level and again becoming effectively conductive only when said speed decreases to a significantly lower level.

14. A control system for an induction motor with at least a pair of poles and a multi-toothed rotor and having a first winding and a second winding, comprising:
means for energizing said first winding from an alternating-current source;
a bidirectional switch for connecting the source to said second winding in response to a firing signal;
means for sensing an operating characteristic of said motor to develop a control signal in response to flux variations effected by the teeth in said rotor;
filter means for removing from said control signal components having frequencies of the alternating current;
regulating means responsive to the filtered control signal for developing an average signal proportional to the speed of said rotor; and
trigger means for applying said firing signal to said switch and responsive to said average signal for terminating the application of said firing signal when said speed reaches a predetermined value;
and wherein said regulating and trigger means include logic gates intercoupled as a clocked multivibrator to develop said firing signal in response to an average of said control signal.

15. Apparatus as defined in claim 1 in which said regulating means includes a phase sensitive loop responsive to said control signal for developing said average signal.

16. A control system for an induction motor with at least a pair of poles and a multi-toothed rotor and having a first winding and a second winding, comprising:
means for energizing said first winding from an alternating-current source;
a bidirectional switch for connecting the source to said second winding in response to a firing signal;
means for sensing an operating characteristic of said motor to develop a control signal in response to flux variations effected by the teeth in said rotor;

filter means for removing from said control signal components having frequencies of the alternating current;

regulating means responsive to the filtered control signal for developing an average signal proportional to the speed of said rotor, said regulating means including a phase sensitive loop responsive to said control signal for developing said average signal, said loop includes a phase detector responsive to said control signal for developing a ripple signal, a low-pass filter responsive to said ripple signal for developing said average signal, and an oscillator responsive to said average signal for shifting the phase of said detector into lock with the phase of said control signal;

and trigger means for applying said firing signal to said switch and responsive to said average signal for terminating the application of said firing signal when said speed reaches a predetermined value.

17. Apparatus as defined in claim 16 in which said oscillator is operable only at frequencies greater than significant harmonics of the frequency of said alternating current.

18. Apparatus as defined in claim 16 in which said trigger means includes a Schmitt trigger circuit responsive to a value of said average signal only within a selected range for developing said firing signal.

* * * * *